United States Patent
Johnson et al.

(10) Patent No.: US 10,999,902 B2
(45) Date of Patent: May 4, 2021

(54) SYSTEM FOR EFFICIENT COMMUNICATION AND CONTROL FOR CONNECTED MODULES IN LIGHTING FIXTURES

(71) Applicant: Gooee Limited, St Albans (GB)

(72) Inventors: Andrew Johnson, Klosters (CH); Simon Coombes, St Petersburg, FL (US); Shmuel Silverman, Novato, CA (US)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 16/218,068

(22) Filed: Dec. 12, 2018

(65) Prior Publication Data

US 2019/0191522 A1   Jun. 20, 2019

Related U.S. Application Data

(60) Provisional application No. 62/598,664, filed on Dec. 14, 2017.

(51) Int. Cl.

| | |
|---|---|
| *H05B 45/10* | (2020.01) |
| *H05B 47/11* | (2020.01) |
| *H05B 47/19* | (2020.01) |
| *H05B 45/00* | (2020.01) |
| *H05B 45/20* | (2020.01) |
| *H05B 47/105* | (2020.01) |
| *H05B 47/175* | (2020.01) |
| *H04B 10/114* | (2013.01) |

(52) U.S. Cl.
CPC ............ *H05B 45/10* (2020.01); *H05B 45/00* (2020.01); *H05B 45/20* (2020.01); *H05B 47/105* (2020.01); *H05B 47/11* (2020.01); *H05B 47/175* (2020.01); *H05B 47/19* (2020.01); *H04B 10/1149* (2013.01)

(58) Field of Classification Search
CPC ............ H05B 33/0854; H05B 33/0842; H05B 37/0218; H05B 37/0245; H05B 37/0272; H05B 10/1149
See application file for complete search history.

(56) References Cited

U.S. PATENT DOCUMENTS

| | | | |
|---|---|---|---|
| 8,558,413 B1 * | 10/2013 | Lepard | F21V 33/0052 307/150 |
| 2010/0118148 A1 * | 5/2010 | Lee | F21V 23/045 348/164 |

(Continued)

*Primary Examiner* — Henry Luong
(74) *Attorney, Agent, or Firm* — McBee Moore & Vanik IP, LLC

(57) ABSTRACT

According to some embodiments a system may control connected modules within a lighting fixture. The system may comprise a power supply that includes a first input to receive AC power, a second input to receive a control signal, and an output to transmit DC power. A light emitting diode (LED) array may receive DC power from the power supply. A master control unit may receive DC power from the power supply. The master control unit may comprise a first control line to send a control signal to the power supply to control the LED array and a second control line to control one or more modules. The system may further comprises one or more connectors mounted to a circuit board where at least one of the one or more connectors is electrically coupled to the output of the power supply and the second control line.

14 Claims, 19 Drawing Sheets

(56) References Cited

U.S. PATENT DOCUMENTS

2013/0293877 A1* 11/2013 Ramer .................. H05B 47/18
                                                     356/213
2015/0338077 A1* 11/2015 Johnson ............... F21V 23/045
                                                     362/234
2017/0295629 A1* 10/2017 Chiu ........................ F21K 9/68

* cited by examiner

SYSTEM FOR EFFICIENT COMMUNICATION AND CONTROL FOR CONNECTED MODULES IN LIGHTING FIXTURES

CROSS REFERENCE TO RELATED APPLICATIONS

This application claims the benefit of U.S. Provisional Patent Application No. 62/598,664 filed Dec. 14, 2017, which is incorporated herein by reference in its entirety.

FIELD

The present embodiments relates to a system for controlling connected modules in a lighting fixtures.

BACKGROUND

A lighting system may provide illumination that is based on time (e.g., when a user is present) and may be based on location (e.g., lighting a particular area in which a user is interested in occupying or intends to occupy). For example, the lighting system may primarily light an area of a room where a user is located or an area that a user has selected to occupy. Such targeted lighting may be advantageous because it can greatly reduce power consumption compared to conventional lighting systems.

Many lighting system or luminaires employ light-emitting diodes (LEDs) for at least some of the lighting. LEDs are advantageous because they are generally more energy efficient than incandescent or fluorescent lights. A lighting system may include one or more LED lights, one or more fluorescent lights, one or more incandescent light and a sensor unit. The sensor unit receives light from a light source based on a type of sensor being used and the sensor unit may be affected by false ambient light readings. Accordingly, there is a need for a sensor unit for a luminaire to help eliminate false ambient light readings.

BRIEF DESCRIPTION

The present embodiments relate to a system to control connected modules within a lighting fixture. The system may comprise a power supply that includes a first input to receive AC power, a second input to receive a control signal, and an output to transmit DC power. A light emitting diode (LED) array may receive DC power from the power supply. A master control unit may receive DC power from the power supply. The master control unit may comprise a first control line to send a control signal to the power supply to control the LED array and a second control line to control one or more modules. The system may further comprises one or more connectors mounted to a circuit board where at least one of the one or more connectors is electrically coupled to the output of the power supply and the second control line.

In some embodiments, a system to control connected modules within a lighting fixture is disclosed. The system may comprise a LED circuit board that comprises a first portion of a connector that receives DC power from a power supply. A fixture control unit may receive power from the power supply and may send a control signal back to the power supply. A first module may be connected to the LED circuit board via a second portion of the connector and the first module may communicate wirelessly with the fixture control unit. Furthermore, a second module may be connected to the LED circuit board via a second portion of the connector and the second module may communicate wirelessly with the first module.

In some embodiments, a system to control connected modules within a lighting fixture may comprise a LED driver and a LED circuit board. A first module may be coupled to the LED circuit board where the first module comprises (i) a first sensor and (ii) a communications portion for transmitting and receiving information via an IEEE 802.15.4 protocol. Furthermore, a second module may be coupled to the LED circuit board where the second module comprises a master control unit to control an LED array and to control the communications portion of the first module. These and other advantages will be apparent from the present application of the embodiments described herein.

BRIEF DESCRIPTION OF THE DRAWINGS

The above and still further features and advantages of embodiments of the present disclosure will become apparent upon consideration of the following detailed description of embodiments thereof, especially when taken in conjunction with the accompanying drawings, and wherein.

Figure 1:
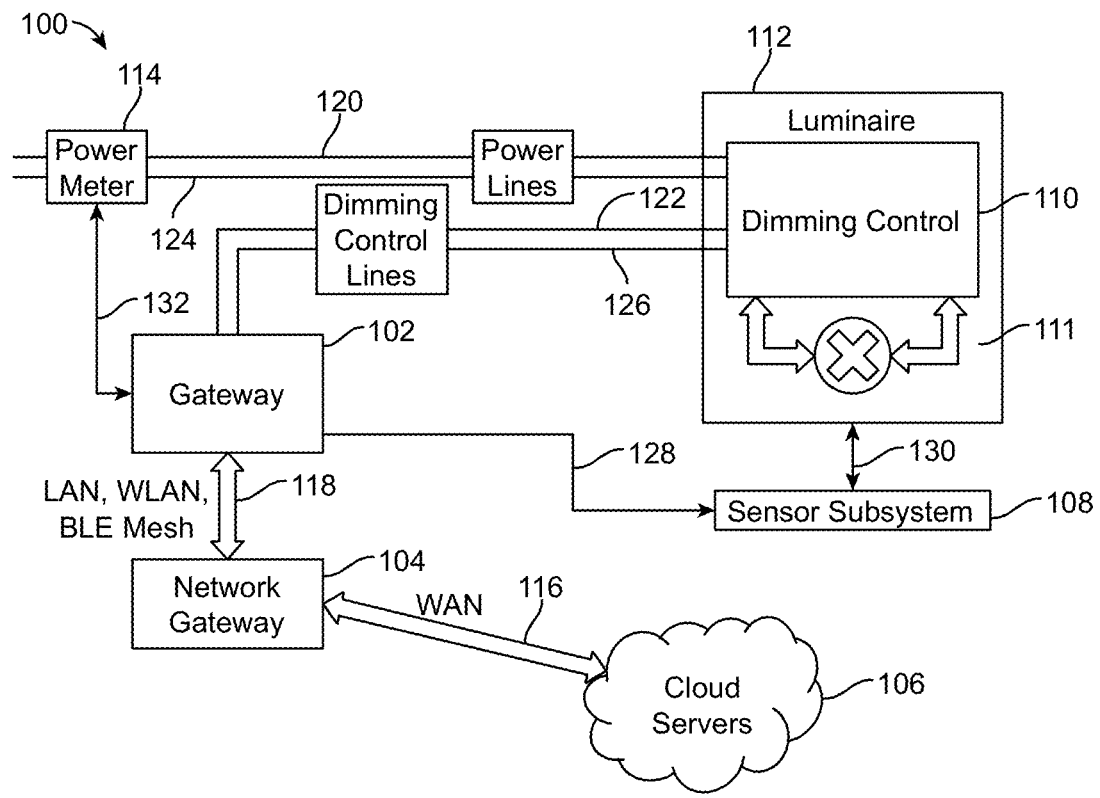
FIG. 1 is a high-level diagram of a system, according to some embodiments.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION

The present embodiments relate to a system and method for efficient communication and control for connected modules in lighting fixtures. Further, the present embodiments may integrate and control the connected modules in the lighting fixture by communicating data using a direct machine to machine communication.

Each lighting fixture may be associated with a system that includes a gateway. The system may further comprise non-limiting types of hardware/wire/bus interfaces between the gateway and a plurality of sensors. The interfaces may be configured as simplified connections, such as, for example, analog interface connectors and/or electrical/digital bus connectors. The gateway may be capable of communicating with and handling a plurality of sensors and sensor protocols via the interface. The gateway may continuously receive performance measurements from the plurality of sensors via a sensor subsystem. The gateway be associated with a plurality of protocols, such as, but not limited to, dimming protocols, sensor interface protocols, discovery protocols and gateway backend control protocols.

Reference will now be made in detail to various embodiments. Each example is provided by way of explanation, and is not meant as a limitation and does not constitute a definition of all possible embodiments. For purposes of illustrating features of the embodiments, various configurations of the embodiments will now be introduced and referenced throughout the disclosure. Those skilled in the art will recognize that these configurations are illustrative and not limiting and are provided purely for explanatory purposes.

Now referring to FIG. 1, an illustrative embodiment of a system 100 for transporting high luminous intensity lights coming out of a plurality of luminaires 112 is illustrated. Each luminaire may include a dimming control mechanism 110 that is controlled by a switch 111. According to some embodiments, a luminaire 112 may be located at a certain distance from a sensor board or printed circuit board (PCB) (as described in greater detail below). In some embodiments, a standalone PCB may include at least one sensor that is capable of sensing a plurality of information. The standalone PCB may be physically connected to a gateway 102 and may transmit information collected by the at least one sensor towards the gateway 102 for further processing.

According to some embodiments, the standalone PCB may be attachable anywhere in an environment where the luminaire 112 is located. In one embodiment, the standalone PCB may be part of a sensor clip that is attachable to the luminaire 112, or a panel in a ceiling, or to other devices in the environment in which the luminaire 112 is located. The standalone PCB may include one upward looking sensor (GSC2) and one downward looking sensor (GSC1), which are placed substantially back to back to each other, as described in greater detail below. In some embodiments, the upward-looking sensor (GSC2) may sense light coming from the luminaire 112, while the downward looking sensor (GSC1) may sense the environment proximate to the luminaire 112. The standalone PCB may be physically connected to the gateway 102 via a sensor communication cable.

According to some embodiments, the luminaire 112 may be arranged such that it is collocated with the standalone PCB, separated from or attached to the standalone PCB, or located at a set distance from the PCB. According to some embodiments, the system 100 may carry the high luminous intensity lights towards a destination area/environment with minimal loss of the lights. According to some embodiments, the system 100 may include a gateway (e.g., a universal smart lighting gateway) 102 arranged in the environment. The system 100 may further include a luminaire 112. In some embodiments, the luminaire 112 may include a single luminaire system having one luminaire 112 or may include a multiple luminaire system having at least two luminaires 112. According to some embodiments, the luminaire 112 may be connected to power lines 120, 124 and dimming control lines 122, 126. In some embodiments, the connection to the power lines 120, 124 and the dimming control lines 122, 126 may be via a single common interface. According to some embodiments, a power meter 114 may be electrically connected to, and positioned between, the gateway 102 and the luminaire 112 on the power lines 120, 124. According to some embodiments, the power meter 114 may be connected to the gateway 102 via a power meter interface 132.

According to some embodiments, the power meter 114 may include a sensor subsystem 108 (e.g., a sensor clip subsystem) that may be coupled to the luminaire 112 on a first side of the luminaire 112 and the luminaire may be coupled to the gateway 102 on a second side of the luminaire 112 (e.g., an opposing side to the first side). In some embodiments, a connection 130 may be provided to connect the sensor subsystem 108 directly the gateway 102 and the luminaire 112. The connection 130 to the luminaire 112 may be a physical connection and the connection 130 may not be limited to a specific location on the luminaire. The location of the sensor subsystem 108 may be different for various types of sensors and luminaires. The gateway 102 may include a backhaul interface 118 associated with a wired or a wireless Local Area Network (LAN), including one or more of Mesh Bluetooth Low Energy (Mesh BLE), WLAN, ZigBee, and/or Ethernet LAN. In an embodiment, the backhaul interface 118 may include an interface associated with a Mesh BLE. According to some embodiments, the gateway 102 may be connected with a network gateway 104, which may be disposed between local networks and a wide area network (WAN) 116, and the WAN 116 may communicate to cloud based servers 106. In some embodiments, the system 100 may further include a dynamic discovery mechanism associated with a dimming protocol that runs over the dimming control lines 122, 126.

Figure 2:
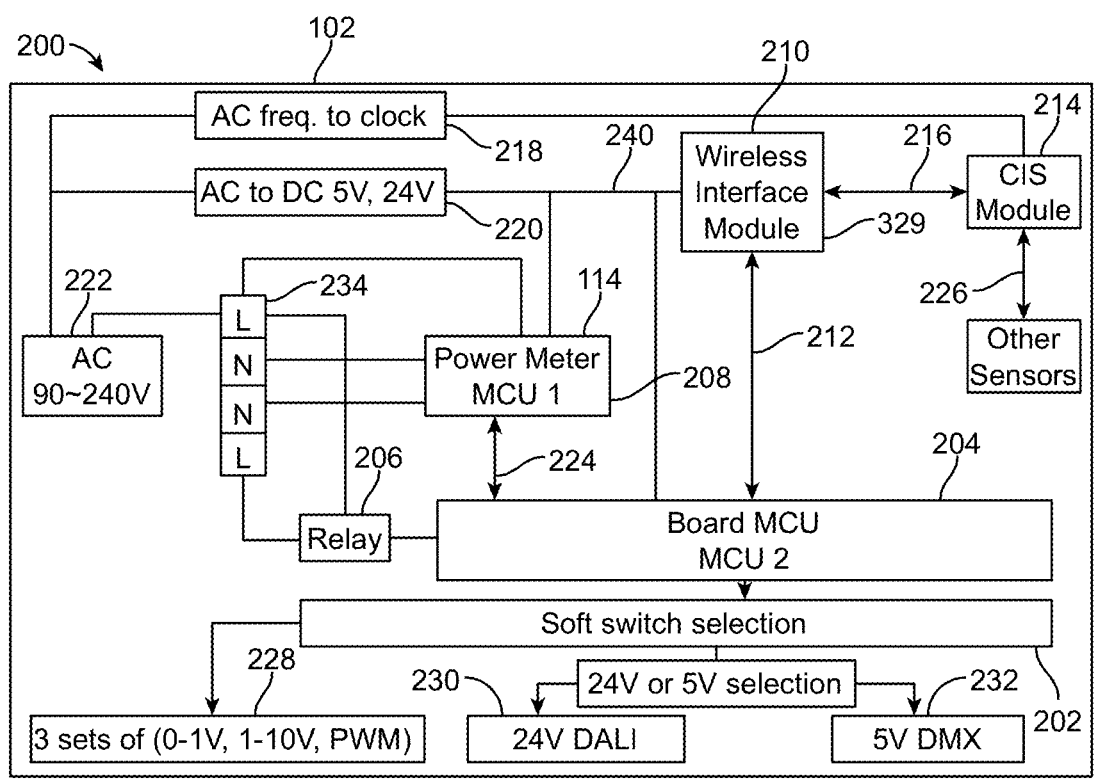
FIG. 2 is a diagram of a system, illustrating a power meter connection, according to some embodiments.

Referring now to FIG. 2, a system 200 that includes a Universal Smart Lighting Gateway 102, a sensor subsystem module 214 and sensor communication 216 is illustrated. According to some embodiments, the sensor subsystem module 214 may be encapsulated within a sensor clip (not shown). In FIG. 2 and according to some embodiments, the system 200 may include a soft switch 202 to select between different electrical dimming interfaces. This soft switch 202 may be actively used in a search for a correct protocol between the gateway 102 and a dimming luminaire 112 (not shown in this figure).

In some embodiments, the system 200 may include a dimming control mechanism performed via a hard switch (not shown in this figure). Protocol modules 228, 230, and 232 may be used in a software implementation of the dimming interfaces that reside in the gateway 102. In some embodiments, the supported dimming protocol may include several sets of protocols 0V-10V, 1V-10V, Protocol for wireless networks (PWN) 228 over 0V-10V and/or 1V to 10V, a 24V Digital addressable lighting interface (DALI) 230 protocol, and a 5V Digital multiplex (DMX) 232 protocol. The protocols may include algorithms, which may be implemented in a Micro Controller Unit 2 (MCU-2) 204. The MCU-2 204 may be powered by the AC to DC 5V, 24V 220 via a power line connection 240. According to some embodiments, the MCU-2 204 may also be connected to a power meter 114 via a Micro Controller Unit 1 (MCU 1) and Universal Asynchronous Receiver/Transmitter (UART) 224. The MCU-2 204 may also be connected to a relay 206. MCU-2 204 may also be connected to a Wireless Interface Module (WIM) 210 via a Serial Peripheral Interface (SPI) bus 212. The WIM 210 may include a wireless interface module between a network and the sensor system and the luminaire. In some embodiments, the MCU-2 204 may also control the relay 206 that is designed to be able to cut off the current to the luminaire 112 upon a decision by the MCU-2 204. The power cutoff may be used to disconnect power from a controlled luminaire subsystem and, in some embodiments, the Wireless Interface Module (WIM) 210 may be implemented as a Bluetooth Low Power (BLE) device using a Mesh BLE protocol to connect with other devices as well having SPI bus 212 and Inter-Integrated Circuit two-wire serial interface bus ("TWSI") 216.

The WIM 210 may be connected to a Camera Interface System (CIS) 214, which may include an environmental sensor (e.g., a camera) and a Red-Green-Blue (RGB) sensor. The CIS module 214 may be extended via a Two-Wire Serial Interface ("TWSI") bus 226 with other sensor modules. The CIS module 214 may utilize a clock, which may be received via an AC Frequency to clock module interface 218. According to some embodiments, the WIM 210 may be powered via the AC to DC 5V to 24V 220 via power interface line 240. The AC Power 90V-240V 222 may be relayed to the MCU2 204 and from it to the soft switch 202 for power selection for the dimming protocol interfaces. The AC Power may additionally be relayed to the power meter 114 which measures all power delivered to the luminaire 112. According to some embodiments, the LNNL 234 may include the physical electrical line connections.

The power meter 114 may be connected to an input line of the luminaire 112 (as shown in FIG. 1) so that the power meter 114 measures, in real-time, electrical power drawn by the luminaire 112. According to some embodiments, the power meter 114 may be coupled to the gateway 102 to provide real time power measurements. The interface 132, between the gateway 102 and the power meter 114, may be a Universal Asynchronous Receiver/Transmitter (UART) or any other communication interface ("power meter interface"). The interface 120, 124 between the power meter device 114 and the luminaire 112 may depend on a type of power meter 114 being used.

Figure 3:
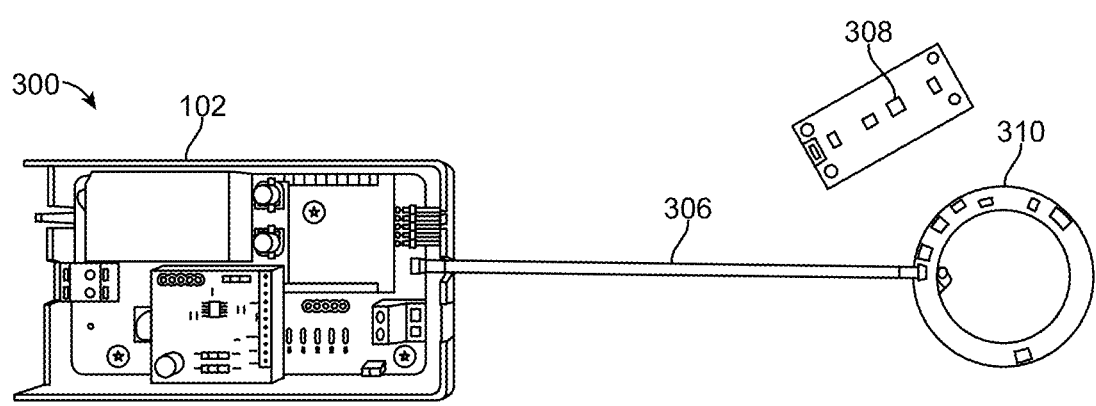
FIG. 3 is a perspective view of a system, illustrating a sensor connection to a luminaire, according to some embodiments.

According some embodiments, and as illustrated in FIG. 3, a system 300 may include one or more sensors 308, 310, typically configured as CIS modules, that are connected to the gateway 102. FIG. 3 illustrates an embodiment that includes at least one of a first CIS module 308 and a second CIS module 310. While only one connection is actually depicted, it would be understood by one of ordinary skill in the art that one or both of the sensors 308, 310 can be connected to the gateway 102. According to some embodiments, the CIS modules 308, 310 may include a physical interface 306 with the gateway 102 via a Two-Wire Serial Interface (TWSI) connection that uses a 6 or 8 pin flexible printed circuit (FPC) cable and connector. The CIS modules 308, 310 may be physically connected at any desired position on a luminaire 112 (not shown in FIG. 3). According to some embodiments, the CIS module 308 may include a linear module that can be adopted to fit on a luminaire 112 requiring a linear fitting. In some embodiments, the CIS module 310 may be circular and may be designed to fit circular-shaped luminaires 112.

In some embodiments, each of the CIS 308 and CIS 310 sensors may include at least two sets of sensors (not shown in FIG. 3). A first set of sensors (e.g., "environment sensors") may be dedicated to environment sensing, and may be arranged such that it faces away from and/or extends in a downwardly fashion, from the luminaire 112. According to some embodiments, a second set of sensors or a single sensor (e.g., a "color sensor"/"RGB sensor") may be arranged such that it faces the luminaire 112 directly. The first set of sensors may be named the environment sensor or GSC1 and the second set may be named the RGB/color sensor or GSC2. The combination of the two sets of sensors, namely the environment sensors and the RGB sensors, may be combined into a single Application Specific Integrated Circuit (ASIC) or may be arranged as a set of separate devices. According to some embodiments, the first and second set of sensors of the CIS 308 and CIS 310 modules may also connect with the gateway. Both sets of sensors may provide real time measurements and assessments to the gateway. In response to the measurements and assessments provided, the gateway may control the dimming device and may change the dimming level and a color temperature and RGB/RGBW (Red Green Blue Warm White) color, in devices that allow for color temperature and RGB/RGBW color control.

According to some embodiments, the system 100 may include the RGB sensor directly facing a luminaire (not shown in FIG. 3). The RGB sensor may measure both the RGB content of a light source and the color/RGB intensity of the light source. According to some embodiments, the RGB sensor or combination of sensors may be configured to measure multiple color channels since the RGB sensor or combination of sensors may directly face the luminaire.

According to some embodiments, the first set of sensors may include magnetometer 3D sensor to sense, in real time, and maintain a correct orientation of every IoT device installed in each luminaire. In some aspects, the first set of sensors may faces away from and/or extends in a downwardly fashion, from the luminaire to track objects in real time.

According to some embodiments, the first set of sensors may face away from and/or extends in a downwardly fashion, from the luminaire 112 to determine optical flow in images based on the Lucas-Kanade method. The general optical flow for an image using the Lucas-Kanade method may include a calculation using two images only: the current image and the previous image. For the current image the difference to the previous image may be calculated by a difference of the pixel values. The pixel difference may be calculated for each of the pixels in the image and an estimate of the direction of the change in pixel value may be calculated using neighboring pixels. The movement direction of each pixel may be summarized by yielding a total movement direction for the image. In some embodiments, a result of the movement calculation may be a flow of the complete image, not a flow of individual objects in the image. It is an underlying prerequisite for this method that an image frame rate is high enough to ensure that the contents of a pixel has not moved beyond the neighboring pixels; in other words, that a value change of a pixel has been relocated to its neighbors. Movement may be calculated as a flow of the pixels in an image that has changed more than a threshold limit. A resulting movement vector may be scaled dynamically to be represented by two signed bytes (one for x-direction and one for y-direction). This may indicate that a speed of the flow in the image may not be available. A movement detection interrupt may not be issued unless three consecutive images show movement. The resulting vector may include an average of the three movement vectors. The number of vectors before movement detected is issued may be configured. The multiple sensors and velocity vectors may be tuned up based on feedback provided by the system such as, for example, a distance between the sensors during lighting installation.

An environment sensor may include a low resolution imaging sensor, such as an array of sensors combined into a low resolution imaging device, or a single ASIC that is an imaging sensor. According to some embodiments, the environment sensor may measure environmental parameters and may be facing away from the luminaries 112. The environment sensor may be arranged to monitor the environment of the light source. According to some embodiments, the down looking environment sensor may include a low-resolution image sensor, an ambient light sensor, orientation sensor, movement detection sensor and a temperature sensor. In some embodiments, the environment sensor may include a plurality of environmental sensors. In other words, the environment sensor may include less or more sensors than described herein. Embodiments in accordance with the present disclosure may use other sensors and more types of sensors to sense the environment. According to some embodiments, the environment sensor may include a single sensor ASIC. The environment sensor may include any sensor that is capable of collecting information to measure the environment, including ambient light and temperature. In some embodiments, the environment sensor may include a camera.

Figure 4:
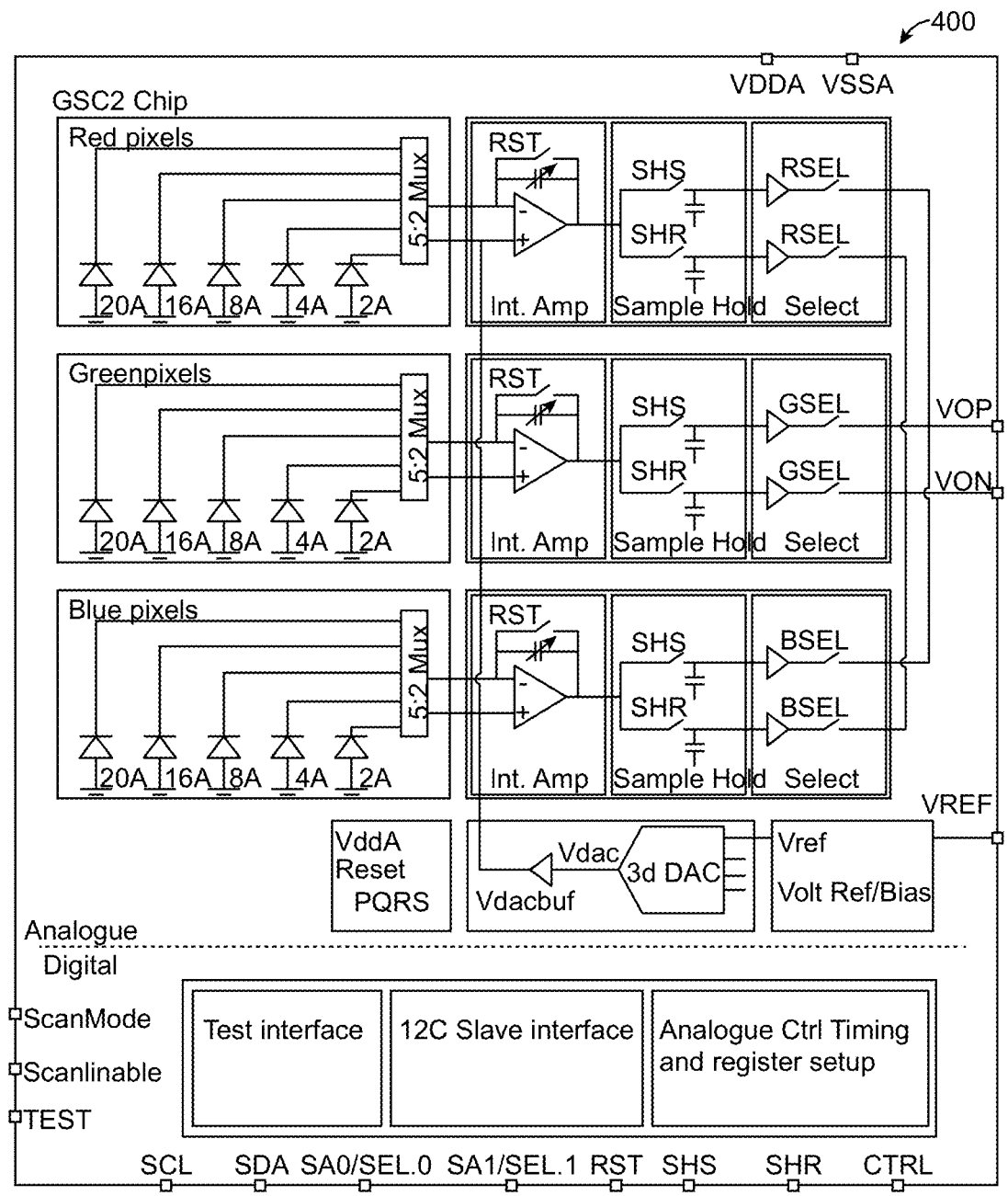
FIG. 4 is a diagram illustrating RGB sensor support chip in measuring RGB content of LED light source, according to some embodiments.

According to some embodiments, the combination of the environment sensor and the color sensor, may be set into one of a single ASIC or a set of separate devices, all of which may also be connected to a gateway such as gateway 102. In some embodiments, the sensors may be directed as follows: the color sensor faces a luminaire and the environment sensor faces away from the luminaire in such a way that the environment sensor monitors the environment. Real time measurements and assessments may be conveyed to a gateway by the sensors that make up a sensor subsystem such as sensor subsystem 108. The ASIC chip may be designed to support a RGB/color sensor (GSC2) in measuring RGB content of LED light source. The RGB/color sensor (GSC2) may interface to environmental sensor (GSC1) and supply RGB analog signals. The RGB/color sensor (GSC2) may include a RGB sensor support chip for environmental sensor (GSC1). The RGB/color sensor may include a highly configurable analog RGB sensor controlled through an I2C interface and a dedicated input. This input may be used to control the timing of the amplifiers and sampling circuit. The RGB/color sensor (GSC2) may include 3 built in integrating amplifiers, Power On Reset, Bias generator, buffered 3bit DAC and photodiodes with RGB filters. The RGB/color sensor (GSC2) may include two outputs OUTP and OUTN which represent the differential output from the selected R, G or B channel. In some embodiments, the two outputs may include analog outputs. The ASIC chip may include area programmable Red, Green and Blue photodiodes connected to an integrating amplifier as illustrated in FIG. 4. Having three parallel signal paths may make it possible to simultaneously integrate a current from the RGB channels. This may ensure that a sampling time is the same for both R, G and B and thereby the ratio between the different channels may be as accurate as possible which may be important for Color temperature calculations (calibration is needed to get the correct ratios). The "CTRL" input may be used by a digital state machine to generate a timing control of the integrating amplifiers. A Voltage Reference circuit may supply the 3-bit DAC circuit with a stable reference voltage. The POR circuit may ensure that a digital circuit is reset and defined during power up and in case the power drops.

Figure 5:
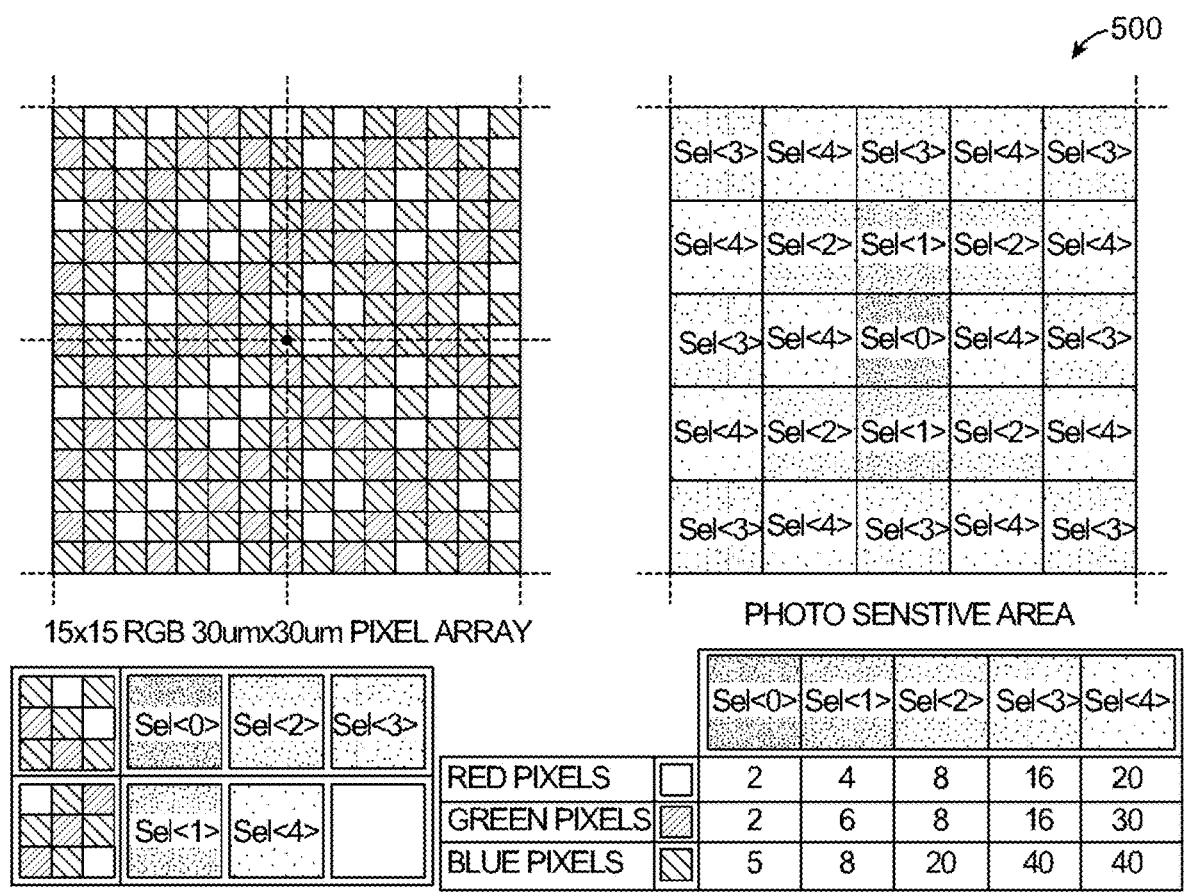
FIG. 5 is a diagram illustrating distribution of RGB pixels in the photo sensitive area of the chip according to some embodiments.

The RGB pixel array may be used to measure both the RGB content of a light source and luminous flux. RGB filters and IR cut filters may be post-processed on the photodiodes. A distribution of RGB pixels in the photo sensitive area of the chip 500 is illustrated in FIG. 5 according to some embodiments. In some embodiments, the RGB pixel array may include 15×15 photodiodes where a pixel size may include 30 µm×30 µm with a fill factor of around 75%. Each pixel in the pixel array may include a built-in transmission gate which may be controlled by the digital core. The light source may be physically in close proximity to the RGB sensor chip. Therefore, the light intensity incident on the photodiodes might be unevenly distributed. To overcome this issue of uneven distribution, the RGB pixel array may be mixed in a certain pattern as shown in top left of FIG. 5. Due to variations in the luminous flux of different light sources, and uncertainty in the placement of the RGB/color sensor (GSC2) with respect to the light source, the photodiode may be subject to a varying amount of illumination. To cope with this wide dynamic range a programmable number of RGB photodiodes may be multiplexed together. This may add one more degree of freedom in addition to integration time and integration capacitance in the integrating amplifier. Furthermore, the sensitivity of the photodiodes covered with blue filters may be less than the sensitivity of red and green photodiodes. For example, in some embodiments, the blue filters may be smaller by a factor of three. Therefore the number of photodiodes covered with a blue filter may be larger than red and green photodiodes. In some embodiments, a factor of 2.5 may be used to provide a reasonable permutation between Red, Green and Blue pixels.

According to some embodiments, the environment and color sensors of the sensor subsystem 108 may be placed or connected on a fitting of a luminaire. The exact location of the sensors may not be fixed (e.g., two different luminaires by a same manufacturer of a same type of fitting and LED specifications may be assembled such that the sensor location is different relative to the surface and dimensions of the fitting). The location of the color and environment sensors on the fitting may not be limited.

Figure 6:
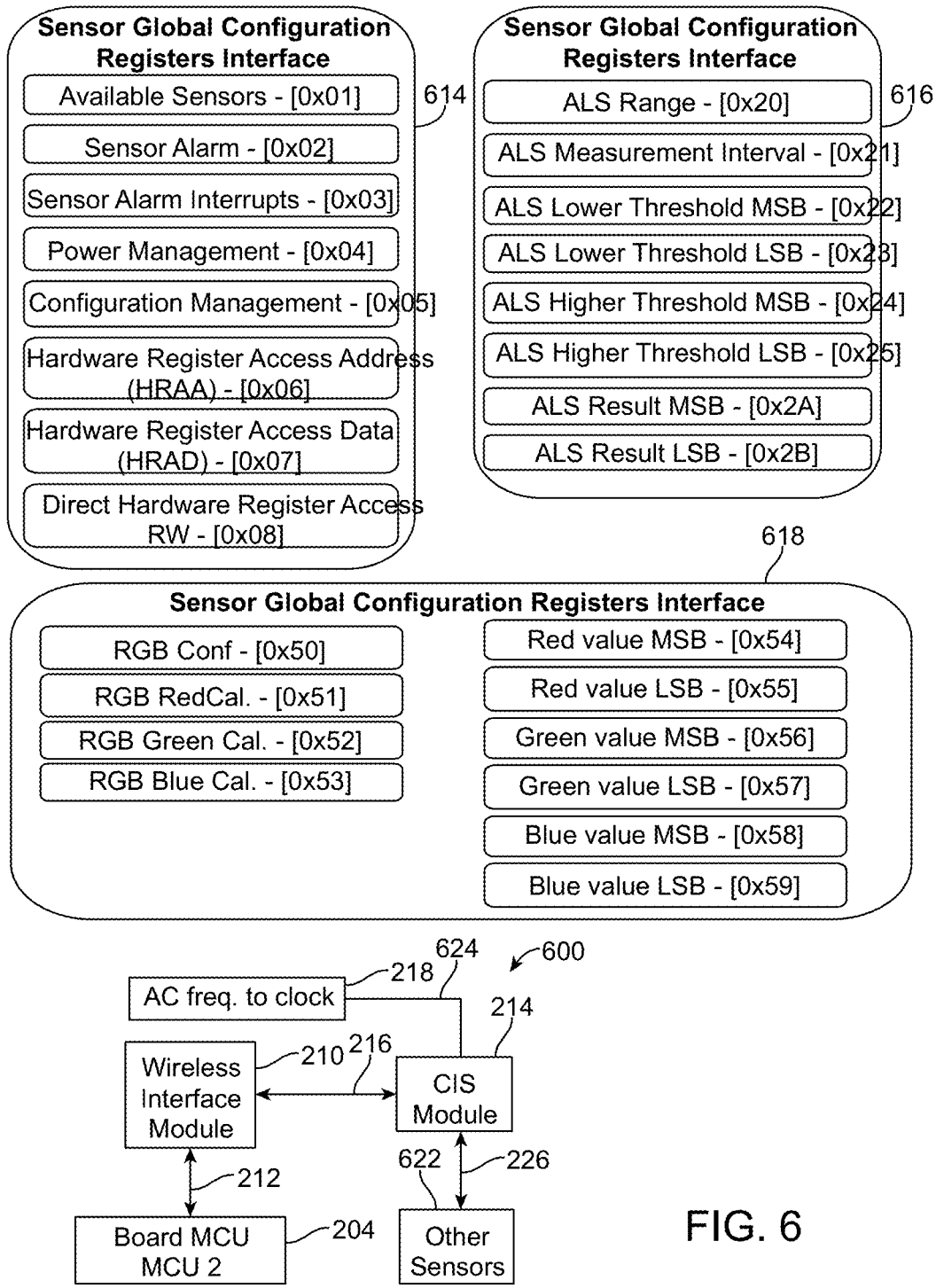
FIG. 6 is a diagram illustrating a type of information/data structure that is receivable by a sensor interface of a system, according to some embodiments.

FIG. 6 illustrates an embodiment of a sensor interface data structure 600. According to some embodiments, a sensor interface may include a Two-Wire Serial Interface (TWSI) 216 that allows the use of memory mapped registers to communicate information between the wireless interface module (WIM) or gateway and a CIS module such as CIS module 214. In turn, the wireless interface module (WIM) or gateway may provide information and receive directives from a Board MCU-MCU 2 such as bard 204 via a SPI bus such as bus 212. As illustrated in FIG. 6, and according to some embodiments, the sensor devices 600 may include multiple registers associated with any/all of its functions. In some embodiments, an interface 216, 226 with the sensor device is an array of eight bit (8-bit) registers (see, for instance, Sensor Global Configuration Register Interfaces 614 and 616). Each register may be mapped to a specific memory address on the wireless interface module (WIM) or gateway 210. In some embodiments, a plurality of interfaces 614, 616, 618 may be provided to control the sensors 600. In the exemplary embodiment of FIG. 6, an example of a register, such as a Sensor Global Configuration Register Interface 614 is illustrated. The Sensor Global Configuration Register Interface 614 may be set as follows: the register in address 0x01 may turn on bits associated with available sensors on the module. If a sensor does not exist, its bit may be set to 0. Available sensors in this embodiment may be: Ambient Light Sensor ("ALS"), Motion detection based on PIR ("PIR"), RGB sensor ("RGB"), Motion detection and direction based on frame capture ("MOT"), LED Lumen sensor ("LL"), and Temperature sensor ("TEMP"). According to some embodiments, the register address 0x02 may be used as an alarm for the different sensors (e.g., one can set the value range so that when reached by the specific sensor the appropriate alarm bit in this register will turn to 1, or else it is 0). The register in address 0x03 may be used for resetting sensor alarms when this occurs. According to some embodiments, the register in address 0x04 is used to power ON and/or OFF the entire sensors' system. The register in address 0x05 may be used for configuration management. Typical registers can be found in register addresses found in 0x06-0x08, as well as 0x20-0x28 and 0x50-0x59. These are merely examples, as one of ordinary skill in the art would understand—additional sensors would expand (or constrict) the registers.

Figure 7:
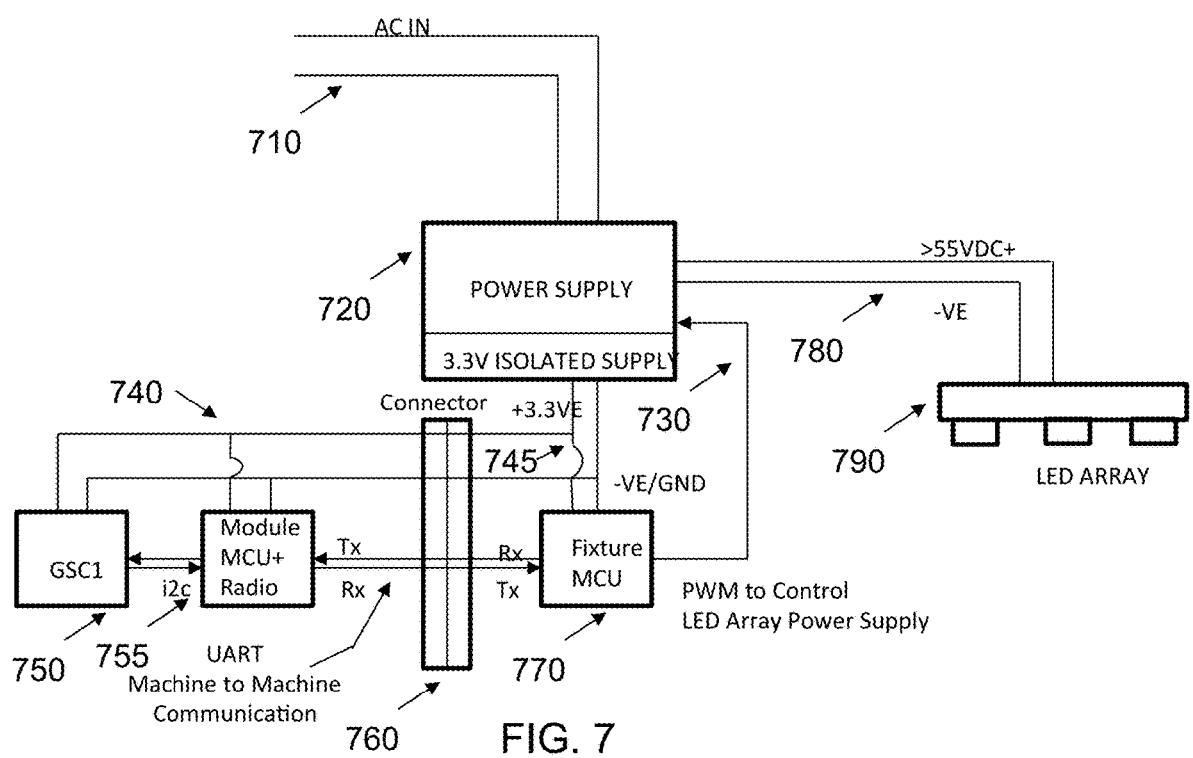
FIG. 7 illustrates a block diagram of a system according to some embodiments.

Now referring to FIG. 7, a system 700 for connectivity between different modules within a luminaire is illustrated according to some embodiments. In some embodiments, the system 700 may allow for efficient communication and control of a plurality of connected modules in a luminaire. The system 700 may comprise a power supply 720 that receives power through AC power lines 710. The power supply may supply a first voltage that is less than 4 volts DC and a second voltage that is greater than 55 volts DC. The power supply 720 may supply power though first voltage lines 745. The first voltage lines 745 may be electrically coupled to a first side of connector 760. Second voltage lines 740 may be electrically coupled to a second side of connector 760 allowing for one or more modules to be supplied power from the power supply 720. In some embodiments, the second voltage lines 740 may comprise contacts associated with a plug-in module.

For example, both a GSC1 module 750 and a MCO+ radio module 755 may comprise plug-in modules that include contacts for receiving power via second voltage lines 740 and, as such, the connector 760 may be able to "connect" a plurality of modules to the system 700.

A fixture MCU 770 may comprise a control unit that may be powered via first voltage lines 745 and may communicate with one or more modules electrically coupled to the connector 760 via serial communication. For example, in some embodiments the MCU 770 may function as a gateway and may communicate with a plurality of modules via a universal asynchronous receiver-transmitter (UART) for machine to machine communication. UART may transmit data in a sequential fashion where the data is re-assembled at a destination into complete bytes. In some embodiments, the serial communication may be performed via a single wire between the MCU 770 and the plurality of modules (via the connector). In some embodiments, the plurality of modules may transmit via a Tx line and may receive data via a Rx line.

The power supply 720 may provide power to an LED array 790 via third voltage lines 780. The third voltage lines may provide power at a voltage that is greater than 55 volts DC. Furthermore, the MCU 770 may control the LED array 790 by sending a signal through control line 730 which is electrically coupled to the MCU 770 and the power supply 720. As such, the MCU 770 may be able to control the LED Array 790 via controlling power sent to the LED array 790 through the third voltage lines 780, or, in some embodiments, the MCU 770 may be able to send signals to control the LED Array through the third voltage lines 780 (e.g., signals to an onboard controller in the LED array 790 that is not illustrated in FIG. 7).

Figure 8:
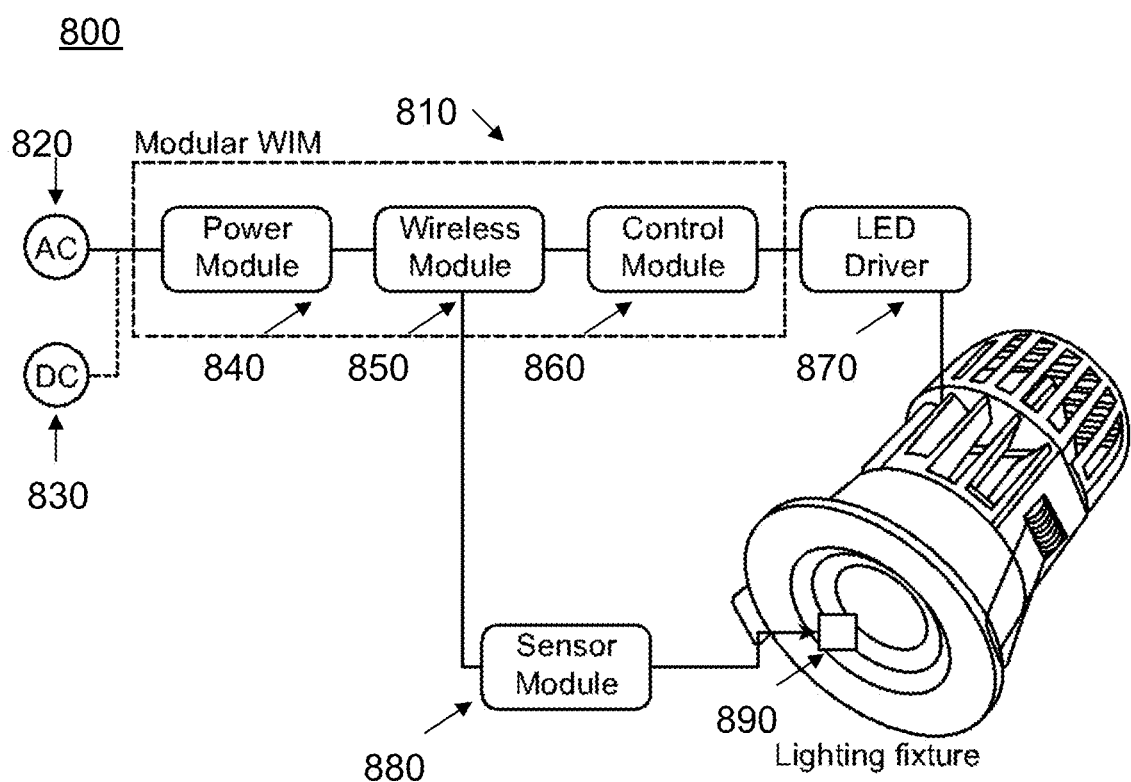
FIG. 8 illustrates a block diagram of a system according to some embodiments.

FIG. 8 illustrates a block diagram of a system 800 that connects a plurality of modules within a luminaire. FIG. 8 may illustrate connectivity of different modules incorporated within a luminaire as described with respect to FIG. 7. In some embodiments, a luminaire may comprise at least one of a wireless interface module 810 or gateway, a sensor module 880, a LED driver 870, and an LED printed circuit board (PCB) 890. In some embodiments, the wireless interface module 810 may comprises a power module 840 for supplying power, a communication module 850 for exchanging data, and a control module 860 to process one or more input data for providing an output to actuate one or more MCUs of the luminaire. The power module 840 may supply power to one or more of the LED array, control module 860, communication and control module 860 and sensor module 880 to a predetermined value. As illustrated in FIG. 8, the plurality of modules may receive power based on AC power 820 and DC power supply 830. The communication module 850 and control module 860 in the wireless interface module 810 may transmit (Tx) and receive (Rx) data via a serial connection such as a UART machine to machine communication as described with respect to FIG. 7.

Figure 9:
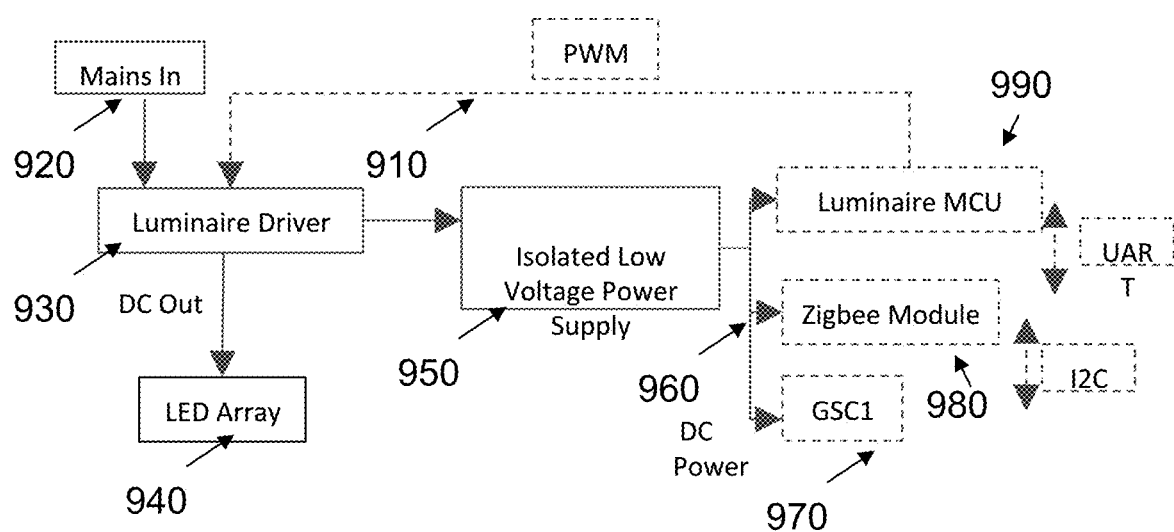
FIG. 9 illustrates a block diagram of a system according to some embodiments.

Turning now to FIG. 9, a dotted line 910 between LED driver 930, Luminaire MCU 990, Zigbee module 980, and sensor module 970 may represent a machine to machine interface via UART, I2C (e.g., a multi-master, multi-slave, packet switched, single-ended, serial computer bus) or Pulse-width modulation (PWM). Furthermore, in some embodiments a non-dashed line may denote a power supply 950 connection to the LED arrays 940, driver, and other modules. Furthermore, AC power may be receive via mains 920. The Zigbee module 980 may relate to a module for transmitting information via an IEEE 802.15.4 protocols in a personal area network (PAN).

Figure 10:
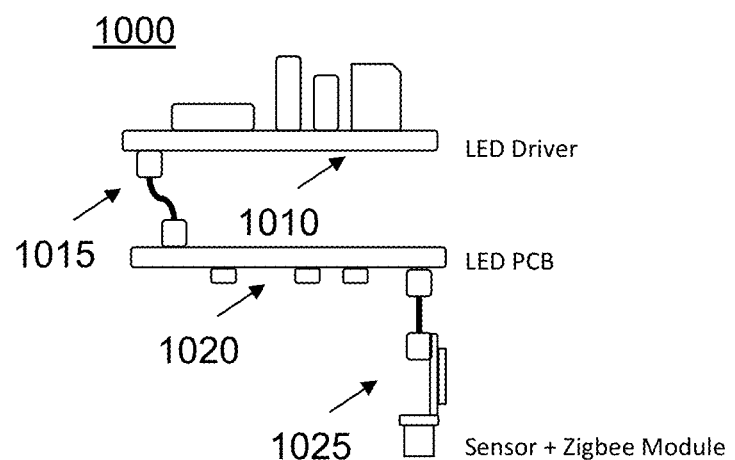
FIG. 10 illustrates a block diagram of a system according to some embodiments.
Figure 11:
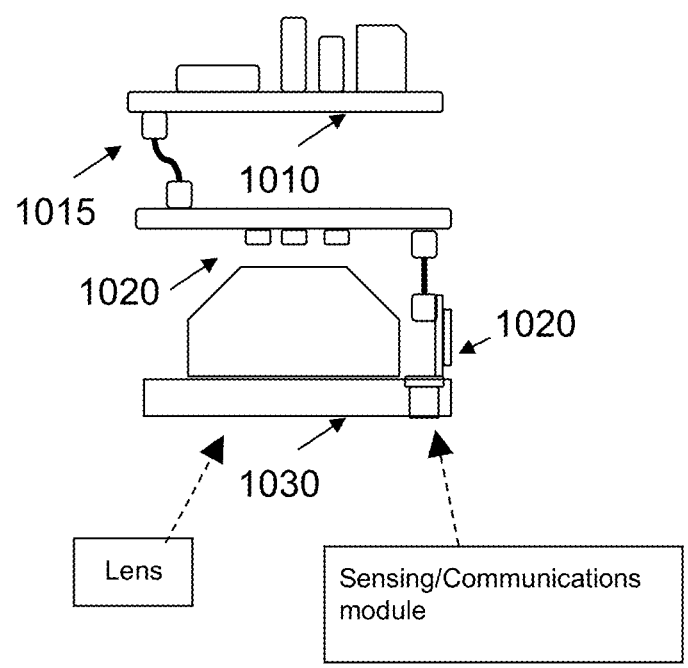
FIG. 11 illustrates a block diagram of a system according to some embodiments.

FIG. 10 and FIG. 11 may illustrate a block diagram of a system associated with connectivity of different modules via the use of a Zigbee protocol (e.g., IEEE 802.15.4) and a sensor module according to some embodiments. As illustrated in FIG. 10, a system 1000 may comprise an LED driver 1010, a LED printed circuit board (PCB) 1020 and a sensor comprising a Zigbee module 1025 which are all incorporated inside a lighting fixture. FIG. 11 further illustrates the system of FIG. 10 comprising a lens 1030. In one embodiment, the LED driver 1010, the LED printed circuit board (PCB) 1020 and the sensor comprising a Zigbee module 1025 may be mounted via one or more connectors on the LED PCB 1020 to control the functioning of a lighting fixture.

Figure 12:
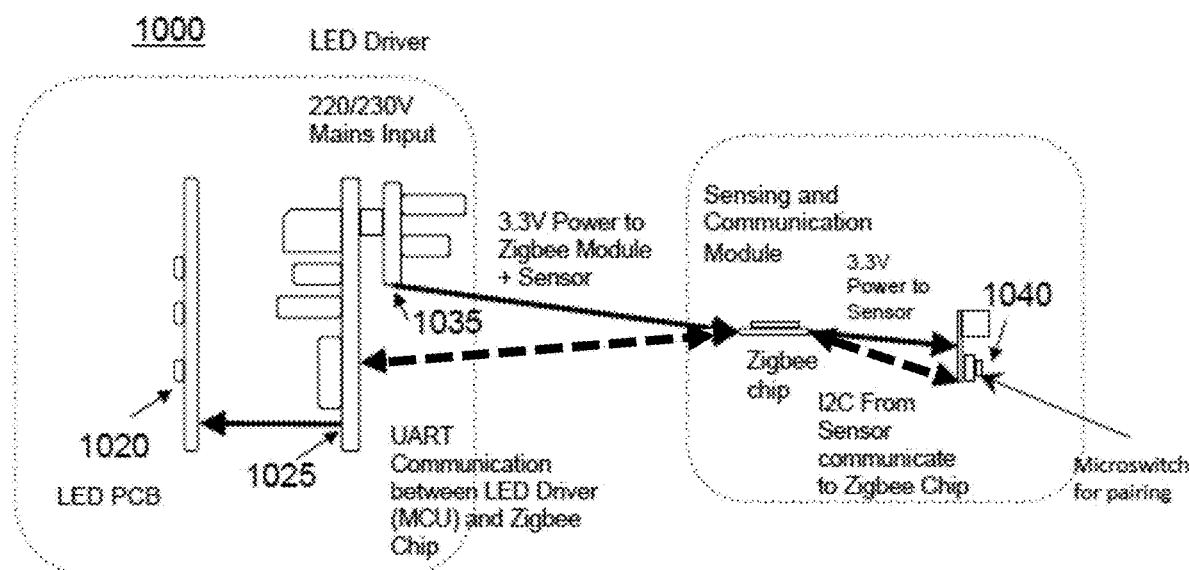
FIG. 12 illustrates a block diagram of a system according to some embodiments.
Figure 13:
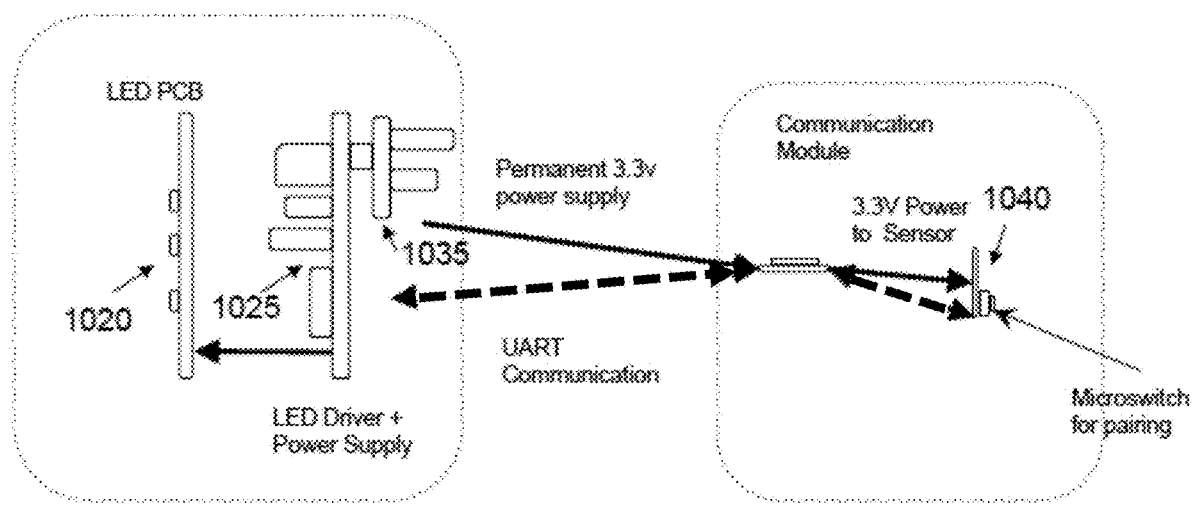
FIG. 13 illustrates a block diagram of a system according to some embodiments.
Figure 14:
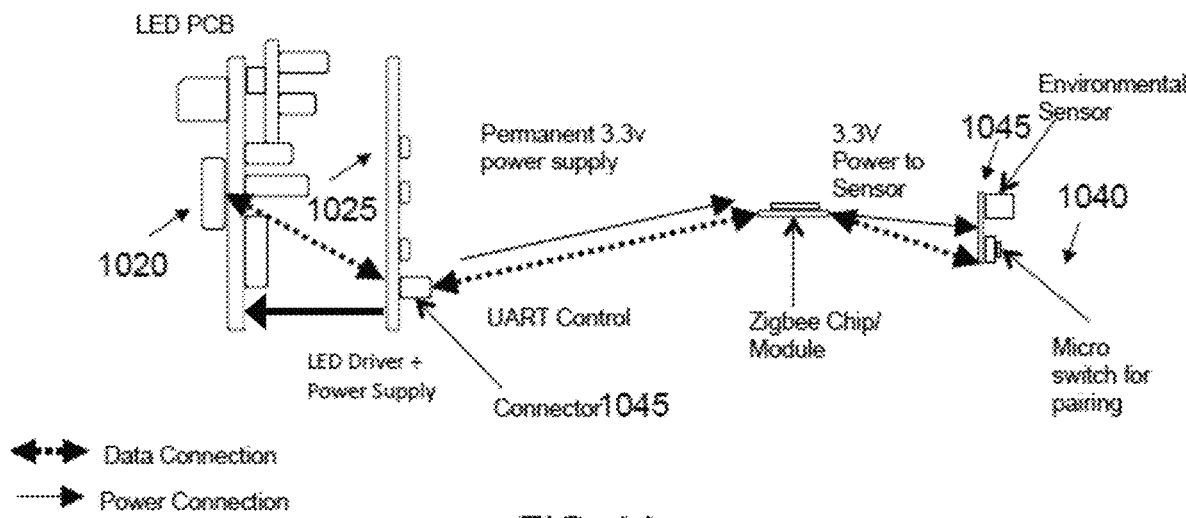
FIG. 14 illustrates a block diagram of a system according to some embodiments.

Now referring to FIG. 12, FIG. 13 and FIG. 14, block diagrams of a system 1000 with connectivity of different modules by data and power connections is illustrated according to some embodiments. As illustrated, the system 1000 comprises a LED PCB 1020, a LED Driver 1025 that comprises a Zigbee chip 1035. The Zigbee chip 1035 may be powered by 3.3V DC. Furthermore, the Zigbee chip 1035 may be coupled to a micro switch 1040 that may be used to initiate pairing between the Zigbee chip 1035 and another networked device (e.g., an LED driver). The dashed lines may disclose a data connection between the embedded modules inside the lighting fixture. Further, the non-dashed lines may depict a power connection between different modules of the lighting fixture. The sensor module 1025 may comprise an environmental or down looking sensor 145 with the micro switch 1040 that may be used for pairing send and receive data to and from the Zigbee chip 1035. Further, the Zigbee chip 1035 may communicate with the LED driver via UART control, where the LED array is controlled by communicating instruction through the LED PCB 1020.

Figure 15:
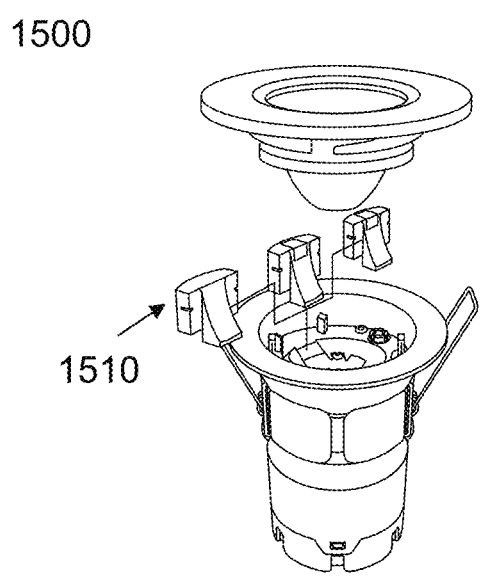
FIG. 15 illustrates an exploded view of a system according to some embodiments.
Figure 16:
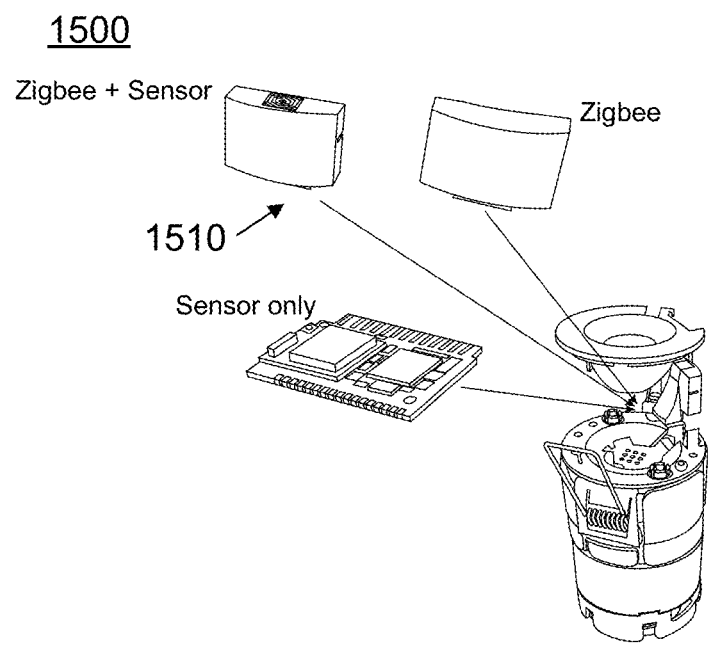
FIG. 16 illustrates a perspective view of a system according to some embodiments.

FIG. 15 may illustrate an exploded view of a lighting system 1500 incorporated with different modules 1510 inside the lighting system. In some embodiments, the modules 1510 may comprise at least one of a sensor module, a communication module, or a combination thereof. In various embodiments, the communication module is one of a WiFi module, a Bluetooth module, or a Zigbee module (e.g., a Zigbee chip). FIG. 16 illustrates a perspective view of the system 1500 incorporated with different modules 1510 inside the lighting fixture according to some embodiments. In some embodiments, the system may comprise any one of a Zigbee module, a sensor module or combination of both the Zigbee and sensor module as a single package fixed inside the lighting fixture via connectors.

In some embodiments, a system for integrating sensor and other devices by communicating data using a wireless interface such as Bluetooth system on chip (SoC) or smart mesh is disclosed. Further, the system may be configured to send and receives control data (instructions) from the smart mesh to control the connected devices. In an embodiment, the system may comprise one or more communication device and one or more control devices. The said communication device and control device may comprise a Bluetooth system on chip (SoC) with an application processor, crypto chip and related support circuits as a module. The said communication device and control devices may be configured into a single package or module. The system may enable ease in integration into the devices which may be required to be controlled or monitored.

In one embodiment, the system may be powered by means of connected or integrated devices. Further, the system may also be connected by a number of communication buses such as inter-integrated circuit interface (I2C), Universal Asynchronous Receiver/Transmitter (UART), Serial Peripheral Interface (SPI) or general purpose input/output controller interface (GPIO), for communicating different types of data from the devices. In some embodiments, the type of data may include, but not limited to, power usage including real or apparent power usage, power factor, actual voltage, actual current, temperature, device status, push button signal, switching status, or analogue voltage level (via GPIO).

In some embodiments, the system may be provided with in-built control interfaces or buses for enabling control and communication functions between devices. In some embodiments, the control and communication interfaces or buses includes, a PWM (3 channel) for direct dimming or other analogue control applications, a relay for simple on/off switching of devices, a DALI broadcast for direct control of lighting fixtures with integrated DALI interfaces, Universal Asynchronous Receiver/Transmitter (UART), inter-integrated circuit interface (I2C) or Serial Peripheral Interface (SPI) for control via direct communication to device control microprocessors or microcontrollers, general purpose input/output controller interface (GPIO) for programmed communications. In some embodiments, the system may include one or more said interfaces, multiple, or all interfaces simultaneously.

Figures 17A, 17B, 17C:
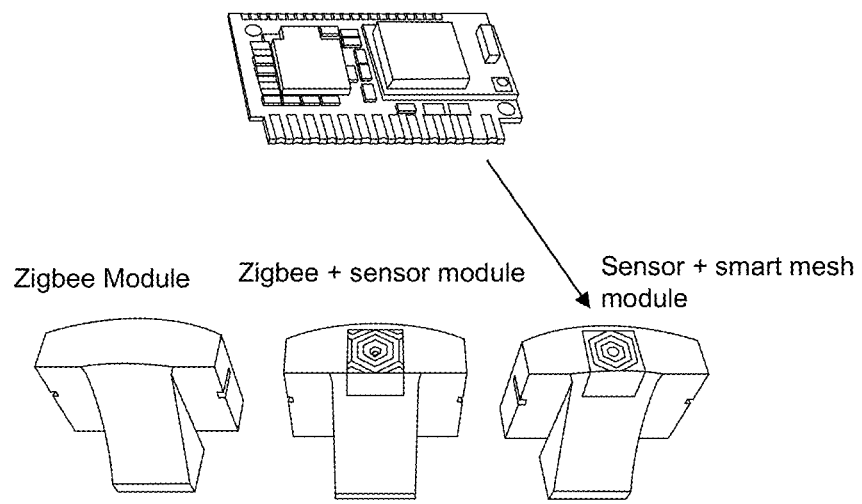
FIG. 17A-17C illustrates modules according to some embodiments.
Figure 18A:
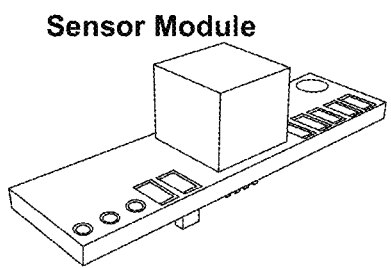
FIG. 18A-18B illustrates a perspective view a module according to some embodiments.
Figure 18B:
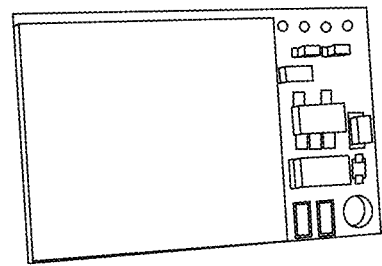

FIGS. 17A-17C illustrate a perspective view of the system incorporated with different packages of communication and sensor modules inside a lighting fixture. FIG. 17A may illustrate a Zigbee module, FIG. 17B may illustrate a Zigbee module and sensor module in combination, and FID. 17C shows the sensor and smart mesh Bluetooth communication module. FIG. 18A and FIG. 18B may illustrate a perspective view of a sensor module and Zigbee module incorporated in the lighting fixture according to some embodiments. As illustrated in FIG. 18A, a sensor or plurality of sensors may be embedded on a sensor board configuration. As illustrated in FIG. 18B, a Zigbee module/chip may be embedded on a board that may be fixed inside a lighting fixture. In some embodiments, a physical packaging of a module may have has two alternative mounting methods. The modules may comprise a primary, and secondary interface. In one embodiment, the primary interfaces, or lighting control and communications interfaces may be oriented or placed on one side. The primary interfaces may be accessed by surface mounting the module, or by mounting the module vertically in a slot, that could be custom manufactured in a parent or master board. This configuration may allow an integrated antenna on the module to be placed away from the parent board meaning the antenna keep out area can be respected in a smaller overall footprint.

In another embodiment, the secondary interfaces may be placed in a smaller pitched connector on another side of the board, which may be accessed primarily when the module is surface mounted or flat mounted. In one embodiment, the system may further comprise of a sensor board, packaged sensor board or sensor components integrated into a customized embodiment of the sensor board design. This may comprise one or more Application Specific Integrated Circuit (ASIC) Sensors, a motion detection passive infrared (PIR) or other third-party sensors. This may have a wired interface connected to the group controller (GC) enabled device.

In a case that the sensor board communication between a sensor and another module being via RS232, the connection may comprise a wired connection with supporting buffering of the RS232, where the termination of the wired connection may be enabled on a connected device. Other solutions might include direct connection between the UART interface to the sensor board, where the sensors and modules are in close proximity, or using inter-integrated circuit interface (I2C) direct communication, where the devices are on the same board.

Figure 19:
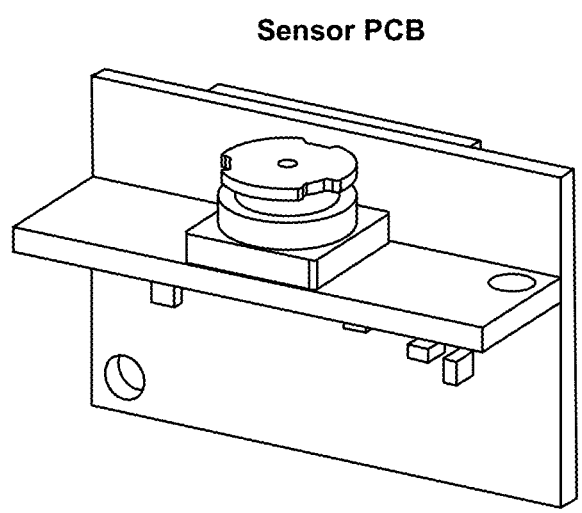
FIG. 19 illustrates a perspective view a module according to some embodiments.

FIG. 19 may illustrate a perspective view of the sensor module for the lighting fixture, according to the present embodiments. The present embodiments may relate to an efficient design for a sensor board incorporated with multiple sensors, interface and communication gateway. In some embodiments, the sensor board may comprise an environmental sensor on one side, and a RGB color sensor on another side. The environmental sensor and the RGB color sensor may be oriented 180° apart from each other accommodated in the sensor, thereby enabling upward and downward functionality of the sensors respectively. In some embodiments, the orientation of the environmental sensor may be configured to limit light being incident from the luminaire to eliminate false ambient light readings. In some embodiments, the orientation of the RGB color sensor may be configured to receive direct light from the luminaire.

In one embodiment, the environmental sensor is configured to face downward and away from the luminaire/lighting system. In another embodiment, the RGB color sensor is configured to face upward and towards the luminaire/lighting system. In one embodiment, the environmental sensor comprises adjustable lens assembly, thereby configured to set pre-defined field of view. In an embodiment, the sensor board for lighting system, further comprises one or more supporting components and a connector housing.

The environmental sensor and the RGB color sensor may be connected via an actuator sensor (AS) interface. The environmental sensor and the RGB color sensor may be connected to a microcontroller unit (I2C to serial MCU) via an inter-integrated circuit interface (I2C), thereby receiving one or more sensed data from the said sensors. Further, the microcontroller unit (I2C to serial MCU) may be connected to the external communication gateway (RS232 USB driver) via a user authorization request (UAR) interface, thereby communicating the sensed data from the sensors. In some embodiments, the sensor board may further comprises one or more additional slave devices/sensors that are connected to the microcontroller unit (I2C to serial MCU) via the said inter-integrated circuit interface (I2C), thereby receiving the sensed data from the said additional/auxiliary sensors. In some embodiments, the additional sensors may include one or more light ambient sensors, PIR sensors, temperature sensors, image sensors or barometric sensors.

In some embodiments, the sensor board may further comprise a capability of integration with multiple sensors such as a PIR sensor. In some embodiments, the sensor board may further comprises a drain and smoothing circuit, wherein the smoothing circuit is configured to allow direct connection for three pin PIR sensor. The sensor board may further comprise an external bandpass filter resistors and capacitors configured to allow bandpass configuration of two AC coupled amplifiers integrated into the ASIC.

The present disclosure, in various embodiments, configurations and aspects, includes components, methods, processes, systems and/or apparatus substantially developed as depicted and described herein, including various embodiments, sub-combinations, and subsets thereof. Those of skill in the art will understand how to make and use the present disclosure after understanding the present disclosure. The present disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges there between. It is to be expected that variations in these ranges will suggest themselves to a practitioner having ordinary skill in the art and, where not already dedicated to the public, the appended claims should cover those variations.

The terms "determine", "calculate" and "compute," and variations thereof, as used herein, are used interchangeably and include any type of methodology, process, mathematical operation or technique.

The foregoing discussion of the present disclosure has been presented for purposes of illustration and description. The foregoing is not intended to limit the present disclosure to the form or forms disclosed herein. In the foregoing Detailed Description for example, various features of the present disclosure are grouped together in one or more embodiments, configurations, or aspects for the purpose of streamlining the disclosure. The features of the embodiments, configurations, or aspects of the present disclosure may be combined in alternate embodiments, configurations, or aspects other than those discussed above. This method of disclosure is not to be interpreted as reflecting an intention that the present disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the present disclosure.

The term "module" as used herein refers to any known or later developed hardware, software, firmware, artificial intelligence, fuzzy logic, or combination of hardware and software that is capable of performing the functionality associated with that element.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

Moreover, the description of the present disclosure has included descriptions of one or more embodiments, configurations, or aspects, and certain variations and modifications, other variations, combinations, and modifications that are within the scope of the present disclosure, as may be within the skill and knowledge of those in the art, after understanding the present disclosure. Furthermore, it is intended to obtain rights which include alternative embodiments, configurations, or aspects, to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A system for controlling connected modules in a lighting fixture, the system comprising:
    a luminaire including a light emitting diode (LED) array;
    an LED driver for controlling the LED array;
    a master control unit for controlling the LED driver;
    a sensor module comprising at least one environmental sensor and a color sensor,
        wherein the at least one environment sensor that faces downwardly in a direction away from the lighting fixture,
        wherein the at least one environment sensor includes a low-resolution image sensor, an ambient light sensor, an orientation sensor, a movement detection sensor, and a temperature sensor,
        wherein the color sensor faces the luminaire directly for measuring a color intensity a light source,
        wherein the at least one environmental sensor and color sensor are oriented 180° apart from each other,
    and
    a first plug-in module for executing at least one of a lighting control function, a communication function, or a power supply function of the lighting fixture,
        wherein the first plug-in module is interchangeable with a second plug-in module for executing the at least one of the lighting control function, the communication function, or the power supply function of the lighting fixture,
        wherein at least one of the first plug-in module or the second plug-in module comprise a primary interface and a secondary interface, and
        wherein the primary interface or the secondary interference is accessed in view of a mounting orientation of said at least one of the first plug-in module or the second plug-in module.

2. The system of claim 1, wherein the first plug-in module and the second plug-in module are different.

3. The system of claim 1, wherein the master control unit is configured for integrating the second plug-in module into the system.

4. The system of claim 1, wherein the first plug-in module is a wireless communication module.

5. The system of claim 4, wherein
    the wireless communication module is configured to transmit and receive data according to a WiFi, Bluetooth, or Zigbee wireless communication protocol, and the LED driver is configured to receive and operate according to the corresponding communication protocol.

6. The system of claim 4, wherein the wireless communication module is a Zigbee module, a combined Zigbee and sensor module, or a combined sensor and smart mesh module.

7. The system of claim 1, wherein the first plug-in module is a dual communication-sensor module.

8. The system of claim 1, further comprising a gateway for transmitting information from the connected modules to a server, wherein the server is a cloud server.

9. The system of claim 1, further comprising a power supply, wherein the power supply has two or more contacts configured for electrical contact with said at least one of the first plug-in module and the second plug-in module.

10. The system of claim 1, further comprising a power supply, wherein the power supply has two or more contacts electrically coupled to a first side of a connector, wherein two or more second voltage lines are electrically coupled to a second side of the connector and configured for electrical contact with said at least one of the first plug-in module and the second plug-in module, and the master control unit is configured to execute at least one of supplying power, controlling, or communicating with the first plug-in module and the second plug-in module, via the connector.

11. A method for controlling connected modules in a lighting fixture, the method comprising:
    providing a luminaire including a light emitting diode (LED) array;
    providing an LED driver for controlling the LED array;
    providing a master control unit for controlling the LED driver;
    providing a sensor module comprising at least one environmental sensor and a color sensor,
        wherein the at least one environment sensor that faces downwardly in a direction away from the lighting fixture,
        wherein the at least one environment sensor includes a low-resolution image sensor, an ambient light sensor, an orientation sensor, a movement detection sensor, and a temperature sensor,
        wherein the color sensor faces the luminaire directly for measuring a color intensity a light source,
        wherein the at least one environmental sensor and color sensor are oriented 180° apart from each other,
    and
    controlling, with a first plug-in module, at least one of a lighting control function and a communication function of the lighting fixture,
        wherein the first plug-in module is interchangeable with a second plug-in module for executing the at least one of the lighting control function and the communication function of the lighting fixture, and wherein at least one of the first plug-in module or the second plug-in module comprise a primary interface and secondary interface, and
wherein the primary interface or the secondary interface is accessed in view of a mounting orientation of said at least one of the first plug-in module or the second plug-in module; and
powering, with a power supply module, the first plug-in module.

12. The method of claim 11, wherein the first plug-in module and the second plug-in module are different.

13. The method of claim 11, wherein the master control unit is configured for integrating the second plug-in module into a system of controlling the connected modules.

14. The method of claim 11, wherein the first plug-in module is a wireless communication module.

* * * * *